(12) United States Patent
Amanuma

(10) Patent No.: US 7,118,119 B2
(45) Date of Patent: Oct. 10, 2006

(54) VEHICLE WITH ELECTRIC MOTORS

(75) Inventor: Hirokatsu Amanuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 10/704,659

(22) Filed: Nov. 12, 2003

(65) Prior Publication Data

US 2004/0094928 A1 May 20, 2004

(30) Foreign Application Priority Data

Nov. 14, 2002 (JP) .......................... P. 2002-330706

(51) Int. Cl.
*B60K 1/02* (2006.01)
(52) U.S. Cl. .............................. 280/124.135; 180/65.5
(58) Field of Classification Search ............... 180/65.5; 280/124.134, 124.135, 124.136, 124.141, 280/124.156

See application file for complete search history.

(56) References Cited

U.S. PATENT DOCUMENTS 3,302,739 A * 2/1967 Beck et al. .................... 180/24
3,727,938 A * 4/1973 Goodbary et al. ........... 180/253
5,087,229 A * 2/1992 Hewko et al. ............... 475/149
5,322,141 A * 6/1994 Brunner et al. ............ 180/65.5
6,866,114 B1 * 3/2005 Villeneuve .................. 180/254

FOREIGN PATENT DOCUMENTS

JP 2000-016040 1/2000
JP 2000-343920 12/2000

* cited by examiner

*Primary Examiner*—David R. Dunn
(74) *Attorney, Agent, or Firm*—Arent Fox PLLC

(57) ABSTRACT

A first link mechanism of a suspension is provided at a rear end portion of a vehicle for connecting a drive wheel to a vehicle body, so that the drive wheel performs vertical movements relative to the vehicle body via the first link mechanism. In addition, a shock absorber is attached to a lower arm of the first link mechanism for resiliently supporting the drive wheel relative to the vehicle body. Furthermore, a second link mechanism is provided on the upper arm and the lower arm of the first link mechanism which performs symmetrically vertical movements relative to the vertical movements of the first link mechanism, and a motor is integrally attached to the second link mechanism, whereby inertia energy resulting from the vertical movements of the drive wheel and inertia energy resulting from the vertical movements of the motor are made to be offset against each other.

12 Claims, 6 Drawing Sheets

FIG. 8    (Related Art)
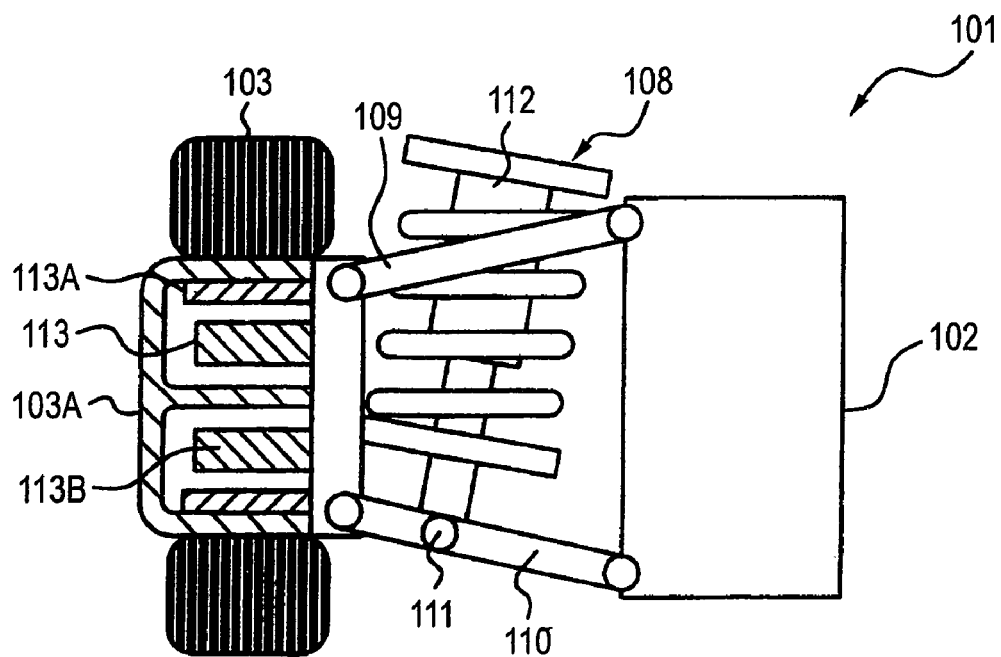
FIG. 9    (Related Art)
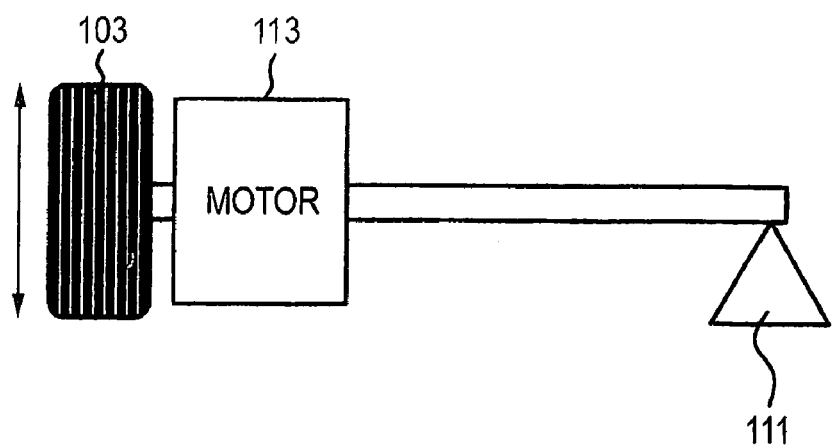

VEHICLE WITH ELECTRIC MOTORS

BACKGROUND OF THE INVENTION

The present invention relates to a vehicle with electric motors which has electric motors functioning at least as drive sources.

Among related vehicles with electric motors, there is a hybrid four-wheel drive vehicle, for example, which installs an engine and electric motors (hereinafter, referred to as motors). In this hybrid four-wheel drive vehicle, the engine and the electric motor are installed, for example, at a front end thereof so that front wheels are driven using the engine and the motor so installed. In addition, the other motors are installed at a rear end of the vehicle so that rear wheels are driven using these motors.

In the related hybrid four-wheel drive vehicle of this type, the front motor is allowed to function as a generator when braking. Namely, when braking, kinetic energy is converted into electric energy (regenerative energy), which can be stored (charged) in a high voltage battery which is provided separately from a low voltage battery for driving auxiliary equipment. On the other hand, when accelerating the vehicle, the stored electric energy is taken out (discharged) from the high voltage battery for use for acceleration. Due to this, with the hybrid four-wheel drive vehicle, effective use of energy can be enjoyed largely when compared with a related normal four-wheel drive vehicle which is driven only by an engine.

Incidentally, in this related art, since the rear motors are disposed by making use of a space between the left and right drive wheels, a space for disposing a fuel tank (a gasoline tank) is reduced by a space occupied by the motors, leading to a problem that disposing an enlarged fuel tank is difficult.

On the other hand, as the other related art, there is known an in-wheel motor type vehicle (for example, refer to Patent literature Nos. 1 and 2) in which a motor is placed in a drive wheel so as to rotate and drive the drive wheel.

[Patent Literature No. 1]
 JP-A-2000-16040 (page 3, FIG. 1)

[Patent Literature No. 2]
 JP-A-2000-343920 (page 3, FIG. 2)

Then, a related in-wheel motor type vehicle of this type will be described by reference to FIGS. 7 to 9. FIG. 7 is a schematic view illustrating the overall structure of the vehicle, and FIG. 8 is a partially enlarged view illustrating a suspension, a motor and the like of the vehicle. Additionally, FIG. 9 is an explanatory view illustrating the movement of the drive wheel and the motor.

Drive wheels 103 are provided at the front and rear of a vehicle body 102 (refer to FIG. 8) of an in-wheel motor type vehicle (hereinafter, referred to as a vehicle) 101 shown in FIG. 7 via suspensions 108, which will be described later on. In addition, a fuel cell 104 and a fuel tank 105 are installed at the front and rear of the vehicle 101, respectively. Then, the fuel cell generates electricity using hydrogen supplied from the fuel tank 105, and electric energy so generated is stored in a battery 106. In addition, the battery 106 is designed to drive motors 113, which will be described later, via a PDU (Power Drive Unit) 107.

In FIG. 8, the suspension 108 is provided between the vehicle body 102 and the drive wheel 103. Then, this suspension 108 includes, roughly speaking, an upper arm 109 and a lower arm 110 which are mounted between the vehicle body 102 and the drive wheel 103 in such a manner as to be vertically spaced away from each other and to oscillate, and a shock absorber 112 attached to a position along the length of the lower arm 110 via a connecting portion 111 (a connecting portion on the vehicle body 102 side is not shown). Additionally, the motor 113 is installed in a wheel 103A of the drive wheel 103, and the motor 113 includes a stator 113A and a rotor 113B.

In the related vehicle 101 constructed as is described above, the four drive wheels 103 are rotated to be driven by activating the motors 113 in the wheels 113A of the drive wheels through feeding from the battery 106. In addition, when vibrations and shocks are applied to the drive wheel 103 from the road surface while running, impacts from those vibrations and shocks are reduced by the shock absorber 112 while the drive wheel 103 is oscillating vertically relative to the vehicle body 102 via the upper arm 109 and the lower arm 110.

Additionally, in the related art like this, the motor 113 is designed to be accommodated in the wheel 103A of the drive wheel 103, when compared with the aforesaid hybrid four-wheel drive vehicle, wide spaces for mounting the fuel cell 104 and the fuel tank 105 can be secured between the left and right drive wheels 103, 103, as shown in FIG. 7, thereby making it possible to attempt to facilitate the enlargement of the fuel cell 104 and the fuel tank 105.

Incidentally, in the vehicle 101 according to the other related art, the motor 113 is designed to be accommodated in the wheel 103A of the drive wheel 103. Namely, in this related art, a construction is adopted in which, as shown in FIG. 8, both the drive wheel 103 and the motor 113 are disposed on one side which constitutes an opposite side to the vehicle body 102 across the shock absorber 112 (the connecting portion 111) (refer to FIG. 9).

Due to this, when shocks and/or vibrations are applied to the vehicle 101, the drive wheel 103 and the motor 113 move vertically together around the connecting point 111 as a fulcrum, as shown in FIG. 9, and as this occurs, inertia energy (moment) resulting from the drive wheel 103 and the motor 113 constitutes a large load which then acts on the shock absorber 112.

As a result, the weight of a lower side of the suspension 103 or a so-called unsprung weight is increased, and the follow-up properties relative to irregularities on the road surface at the time of running are deteriorated, leading to a problem that the riding comfort is deteriorated.

SUMMARY OF THE INVENTION

The invention is made with a view to solving the problem, and an object thereof is to provide a vehicle with electric motors which can secure wide spaces for mounting a fuel tank and a fuel cell, which can suppress an increase in unsprung weight of the suspension, and which can maintain good riding comfort.

A first aspect of the invention which solves the problem is applied to a vehicle with electric motors comprising a vehicle body, electric motors functioning at least as drive sources, drive wheels which are rotated to be driven by the electric motors, and suspensions each having a resilient member adapted for absorbing vibrations transmitted to the vehicle body from the drive wheel and resiliently supporting the drive wheel relative to the vehicle body and a first link mechanism portion adapted for allowing the drive wheel to move vertically relative to the vehicle body and supporting the drive wheel on the vehicle body.

A construction adopted in the first aspect of the invention is characterized in that the vehicle with electric motors comprises further second link mechanism portions each connected to a vehicle body side support portion of the first link mechanism portion and adapted for performing symmetrically vertical movements relative to the vertical movements of the drive wheel, wherein the electric motor is fixedly attached to the second link mechanism portion.

According to the construction, when vibrations and/or shocks are applied to the drive wheel from the outside, the drive wheel moves vertically via the resilient member and the first link mechanism portion of the suspension. Then, since the second link mechanism portion is connected to the vehicle body side connecting portion of the first link mechanism portion, when the drive wheel moves vertically as is described above, the electric motor fixedly attached to the second link mechanism portion performs symmetrically vertical movements relative to the vertical movements of the drive wheel, whereby inertia energy resulting from the vertical movements of the drive wheel and inertia energy resulting from the vertical movements of the electric motor are offset against each other, whereby the unsprung weight of the suspension can be reduced.

In addition, a construction adopted in a second aspect of the invention is characterized in that the electric motor attached to the second link mechanism portion moves vertically around a drive wheel side central point as a fulcrum in such a manner as to form an arc. According to the construction, since the electric motor can be made to move vertically around the drive wheel side central point as a fulcrum in such a manner as to form an arc, when connecting a drive axle (a drive shaft) of the electric motor to the drive wheel, an angle of a joint between the drive axle and the drive wheel can be suppressed to a small angle.

Furthermore, a construction adopted in a third aspect of the invention is characterized in that a drive force from the electric motor is transferred to the drive wheel via a constant velocity joint, a drive axle and a ball joint. According to the construction, even in case the drive wheel and the second link mechanism portion move vertically, the drive (rotation) of the electric motor can be transferred at constant velocities to the drive wheel via the constant velocity joint, the drive axle and the ball joint.

BRIEF DESCRIPTION OF THE DRAWINGS

FIG. 8 is a partially enlarged diagram illustrating a suspension and an electric motor of the vehicle according to the related art.

FIG. 9 is an explanatory diagram illustrating the movements of a drive wheel and the electric motor according to the related art.

DETAILED DESCRIPTION OF THE PREFERRED EMBODIMENTS

Figure 1:
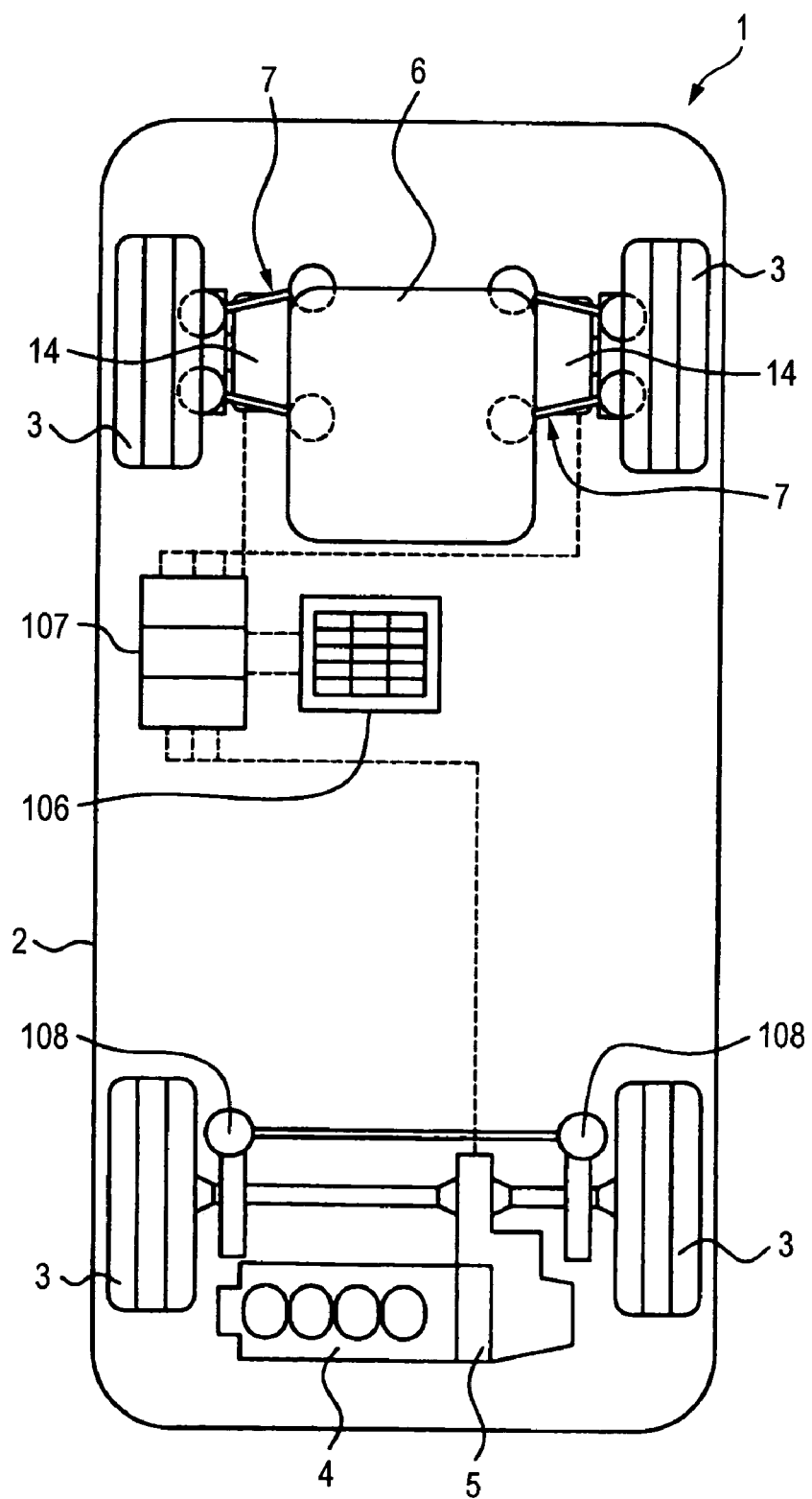
FIG. 1 is a schematic diagram illustrating the construction of a hybrid four-wheel drive vehicle according to an embodiment of the invention.

Referring to FIGS. 1 to 5, a mode for carrying out the invention will be described in detail by taking as an example a case where a vehicle with electric motors according to an embodiment of the invention is applied to a four-wheel drive vehicle. Note that, in this embodiment of the invention, like reference numerals are given to constituent elements which are like to those described with reference to the related art above, and the description thereof will be omitted.

Figure 2:
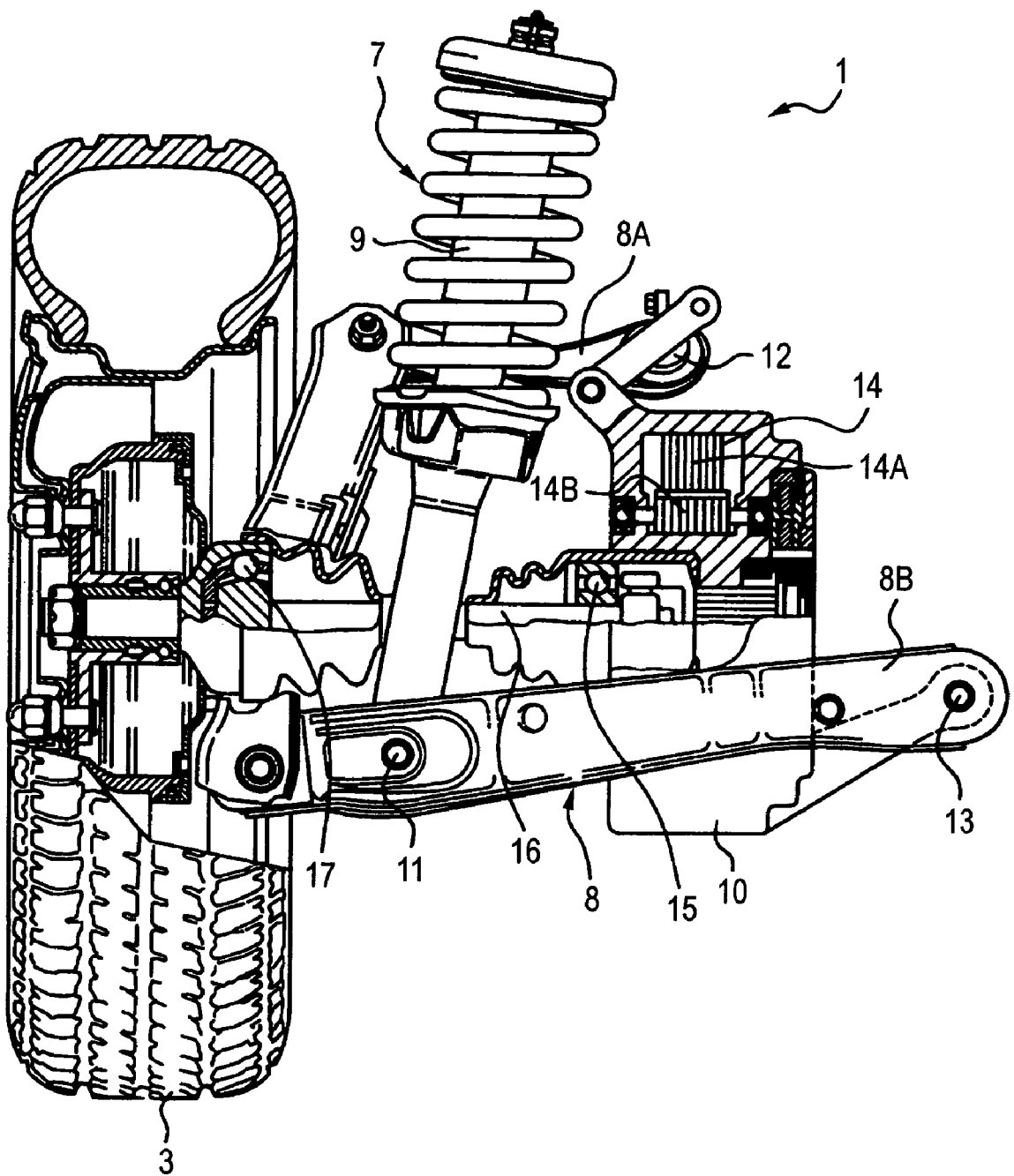
FIG. 2 is a partially enlarged diagram illustrating a motor, a drive wheel and a suspension which are provided at a rear end portion of the vehicle shown in FIG. 1.
Figure 3:
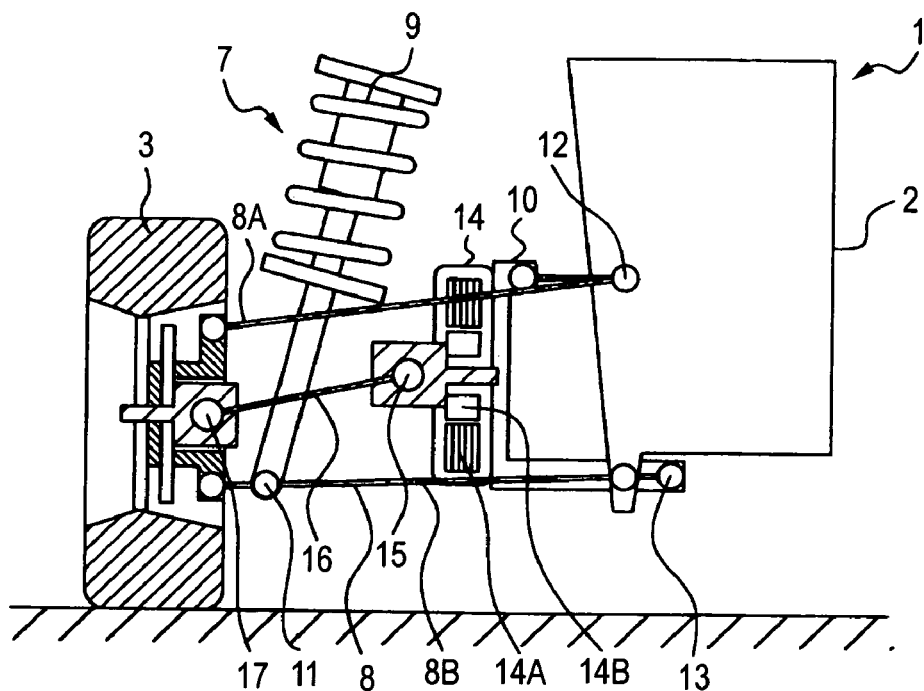
FIG. 3 is a schematic diagram illustrating a state in which a vehicle body is attached to the suspension shown in FIG. 2.
Figure 4:
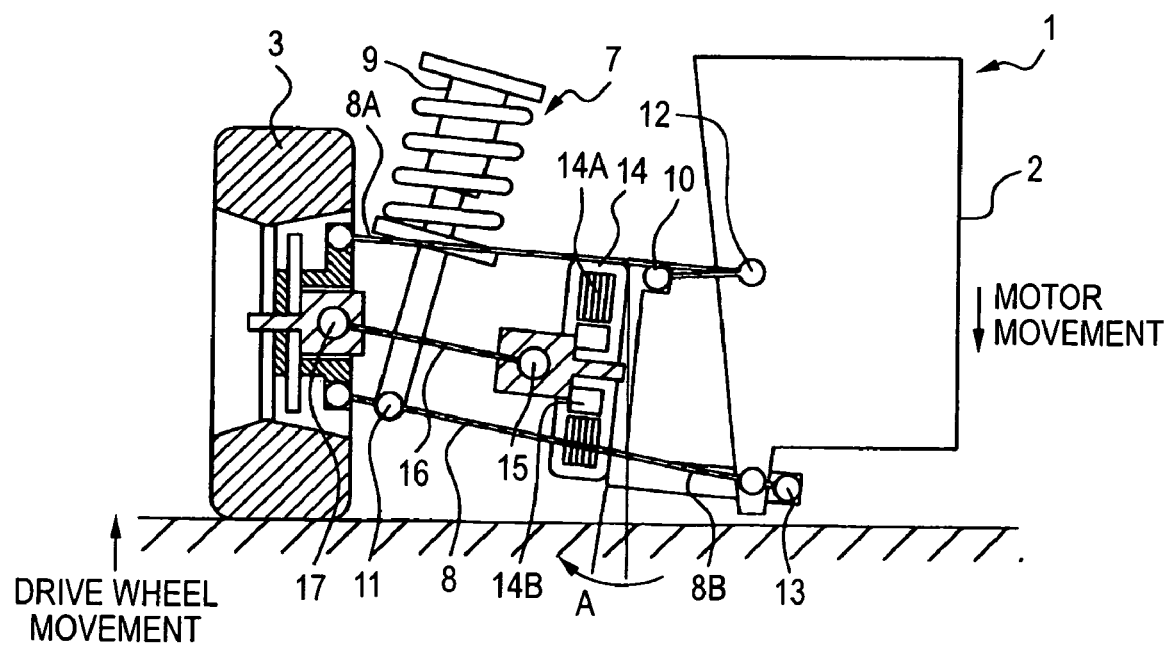
FIG. 4 is a schematic diagram illustrating a state in which the vehicle body shown in FIG. 3 is displaced downwardly.
Figure 5:
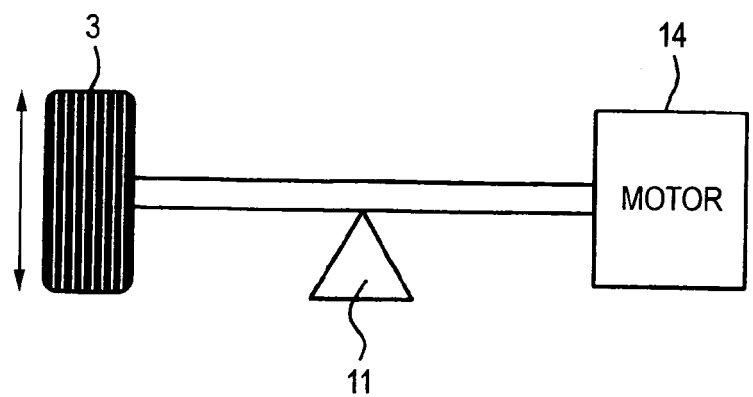
FIG. 5 is an explanatory diagram illustrating the movements of the drive wheel and the electric motor according to the embodiment.

FIG. 1 is a schematic diagram illustrating the construction of a hybrid four-wheel drive vehicle according to an embodiment of the invention, and FIG. 2 is a partially enlarged diagram illustrating an electric motor, a drive wheel and a suspension at a rear of the vehicle. Additionally, FIG. 3 is a schematic diagram illustrating a state in which a vehicle body is attached to the suspension shown in FIG. 2, and FIG. 4 is a schematic construction diagram illustrating a state in which the vehicle body shown in FIG. 3 is displaced downwardly. Furthermore, FIG. 5 is an explanatory diagram illustrating the movements of the drive wheel and the electric motor.

As shown in FIG. 1, the hybrid four-wheel drive vehicle (hereinafter, referred to as the vehicle) 1 according to the embodiment has a vehicle body 2 (refer to FIG. 3) constituting a body of the vehicle 1, and an engine 4 and a motor 5 which are adapted for rotating and driving drive wheels 3 are installed at a front end portion of the vehicle body. Then, the motor 5 functions as a generator when braking. Namely, when the vehicle 1 is made to slow down, kinetic energy is converted into electric energy (regenerative energy) so as to be stored in a battery 106. On the other hand, a fuel tank 6 for the engine 4 is installed at a rear end portion of the vehicle body 2.

As shown in FIG. 3 (refer to FIG. 2), suspensions 7 are provided at the rear end portion of the vehicle 1 for resiliently supporting drive wheels 3 relative to the vehicle body 2. Then, this suspension 7 includes a first link mechanism portion 8 which connects the drive wheel 3 to the vehicle body, a shock absorber 9 functioning as a resilient member for absorbing vibrations transmitted to the drive wheel 3 and a second link mechanism portion 10 connected to the first link mechanism portion 8. Note that reference numeral 6 denotes the fuel tank for the engine 4, reference numeral 7 denoting the rear suspension for resiliently supporting the drive wheel 3 relative to the vehicle body 2, reference numeral 8 denoting the first link mechanism portion for connecting the drive wheel 3 to the vehicle body 2, and reference numeral 14 denoting a motor for rotating and driving the drive wheel 3. In addition, as is described with reference to the related art, reference numeral 106 denotes a battery, reference numeral 107 denoting a PDU, and reference numeral 108 denoting a front suspension.

Here, the first link mechanism portion 8 has an upper arm 8A mounted in such a manner as to oscillate between the vehicle body 2 and the drive wheel 3 and a lower arm 8B situated below the upper arm 8A and attached in such a manner as to oscillate between the vehicle body 2 and the drive wheel 3. Then, this first link mechanism portion 8 is designed to allow the drive wheel to move vertically relative to the vehicle body as shown in FIGS. 3 and 4.

Additionally, the shock absorber 9 is rotatably connected at its lower end to a position along the length of the lower arm 8B via a connecting portion 11 and is rotatably connected at its upper end to a vehicle body 2 side via the other connecting portion (not shown). Then, when vibrations and/or shocks are applied to the drive wheel 3 such that the drive wheel 3 is displaced vertically, the shock absorber 9 generates a damping force in order to prevent the vibrations so generated from being direct transmitted to the vehicle body 2.

Furthermore, the second link mechanism portion 10 is connected at its upper end to the vehicle body together with the upper arm 8A via a connecting portion 12 which constitutes one of vehicle body side support portions and is connected at its lower end to the lower arm 8B via a connecting portion 13 which constitutes the other vehicle body side support portion. Due to this, the second link mechanism portion 10 to which a motor 14, which will be described later on, is integrally attached performs symmetrically vertical movements relative to the vertical movements of the drive wheel, as shown in FIGS. 3 and 4. Namely, when the drive wheel 3 is displaced upwardly, the second link mechanism portion 10 is displaced downwardly, whereas when the drive wheel 3 is displaced downwardly, the second link mechanism portion 10 is displaced upwardly.

As shown in FIGS. 2 to 4, the electric motor (hereinafter, referred to as the motor) 14 which is a rear drive source includes a stator 14A and a rotor 14B, as with the related art example.

The motor 14 used in the embodiment is, however, different from the related art example in that the motor 14 is provided integrally on the second link mechanism portion 10 and in that the motor 14 is disposed on an opposite side to the drive wheel 3 across the shock absorber 9. Then, the motor 14 is connected to the drive wheel 3 via a constant velocity joint 15, a drive shaft 16 which is a drive axle and a ball joint 17, whereby a drive force from the motor 14 is transmitted to the drive wheel 3. Then, the motor 14, which is fixedly provided on the second link mechanism portion 10, is displaced in a direction indicated by an arrow A around a drive wheel 3 side central point (not shown) as a fulcrum in such a manner as to form an arc, while the motor 14 is being displaced vertically together with the second link mechanism portion 10 as shown in FIG. 4.

According to the embodiment of the invention which is constructed as is described above, when vibrations and/or shocks are applied to the drive wheel 3 while the vehicle 1 is running, the shock absorber 9 expands and contracts vertically between the lower arm 8B and the vehicle body 2 while the upper arm 8A and the lower arm 8B which constitute the first link mechanism portion 8 are oscillating between the vehicle 1 and the drive wheel 3, whereby the vibrations applied to the drive wheel 3 can be absorbed.

Incidentally, in a case where the motor 14 is disposed in the interior of the drive wheel 3 as with the related art example (in the case of the in-wheel motor type vehicle), when vibrations are applied to the drive wheel 3 from the outside, since the motor moves vertically together with the drive wheel 3 in the same direction, inertia energy resulting from the drive wheel 3 and inertia energy resulting from the motor 14 constitute together a large load which then acts on the shock absorber 9, thereby increasing the unsprung weight thereof.

According to the embodiment of the invention, however, when vibrations are transmitted to the drive wheel 3 from the outside, whereby the drive wheel 3 is caused to move vertically via the first link mechanism portion 8, the motor 14 connected to the second link mechanism portion 10 performs, as shown in FIG. 5 (refer to FIGS. 3, 4) symmetrically vertical movements around the connecting portion of the shock absorber 9 which is connected to the lower arm 8B as a fulcrum relative to the vertical movements of the drive wheel 3.

By this action of the motor 4, the inertia energy resulting from the vertical movements of the drive wheel 3 and the inertia energy resulting from the vertical movements of the motor 14 can be offset against each other, whereby the increase in unsprung weight of the suspension 7 can be suppressed, and the follow-up properties thereof relative to irregularities on the road surface at the time of running can be increased, thereby making it possible to maintain good riding comfort.

In addition, in the embodiment of the invention, as shown in FIG. 1, since the left and right motors are disposed closer to the drive wheel 3 sides, respectively, at the rear end portion of the vehicle 1, a wide space for mounting the fuel tank 6 can be secured between the left and right drive wheels 3, 3, thereby making it possible to attempt to facilitate the enlargement of the fuel tank 6.

Furthermore, since the motor 14 fixedly provided on the second link mechanism portion 10 is constructed so as to be connected to the drive wheel 3 via the constant velocity joint 15, the drive shaft 16 and the ball joint 17, the motor 14, while being displaced vertically together with the second link mechanism portion 10, can be displaced in the direction indicated by the arrow A (refer to FIG. 4) around the drive wheel 3 side as the center in such a manner as to form an arc, whereby the maximum mounting angle of the drive shaft 16 relative to the drive wheel 3 can be suppressed to a small angle. In addition, even in case the drive wheel 3 and the second link mechanism portion 10 move vertically, the drive force (rotation) of the motor 14 can be transferred at constant velocities to the drive wheel 3 via the constant velocity joint 15, the drive shaft 16 and the ball joint 17, thereby making it possible to maintain the running performance.

Note that the embodiment is described by taking as an example the case where only the rear suspension 7 is constituted by the first link mechanism portion 8 and the second link mechanism portion 10, and the motor 14 is integrally provided on the second link mechanism portion 10.

Figure 6:
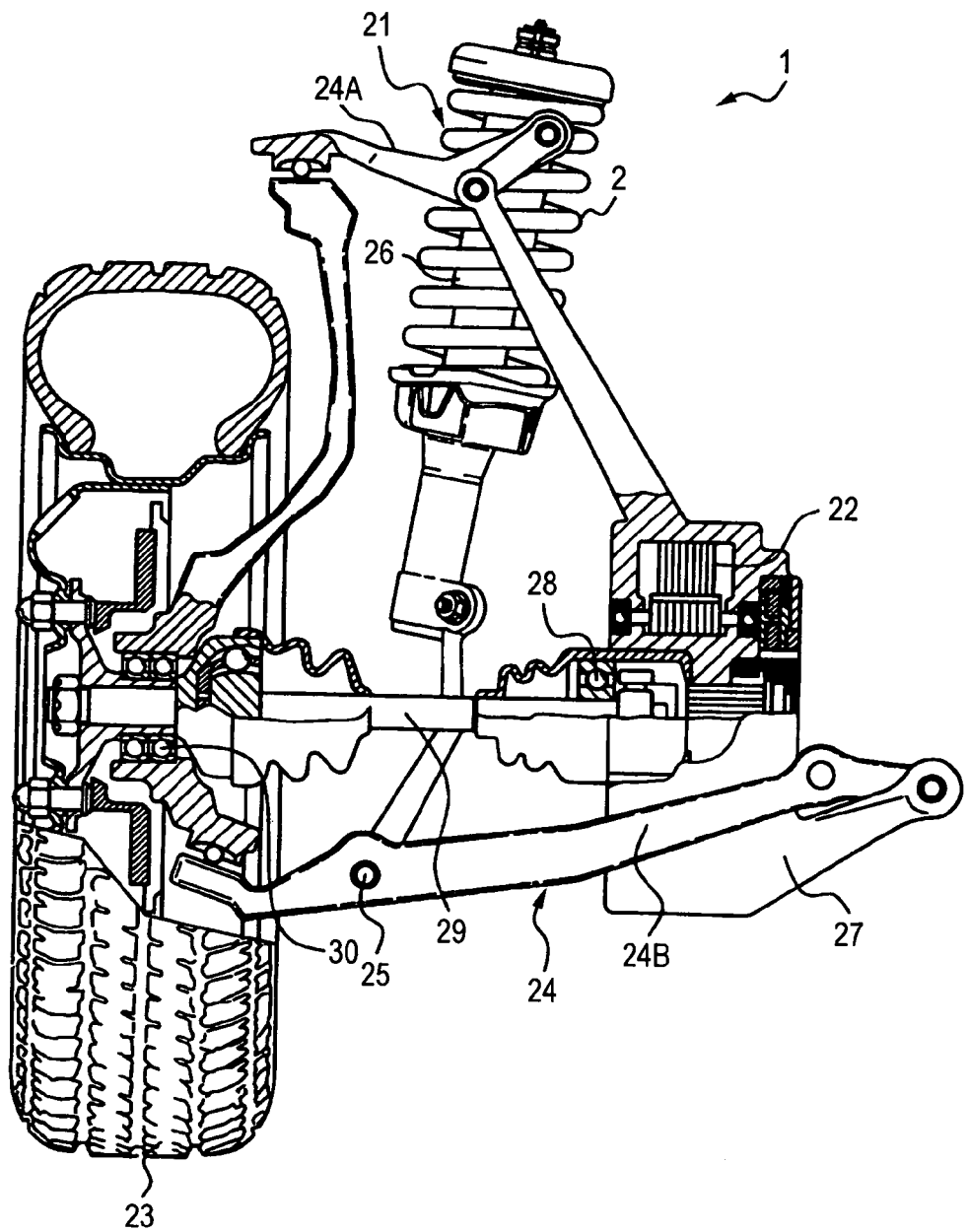
FIG. 6 is a partially enlarged diagram illustrating a motor, a drive wheel and a suspension according to a modification of the invention.
Figure 7:
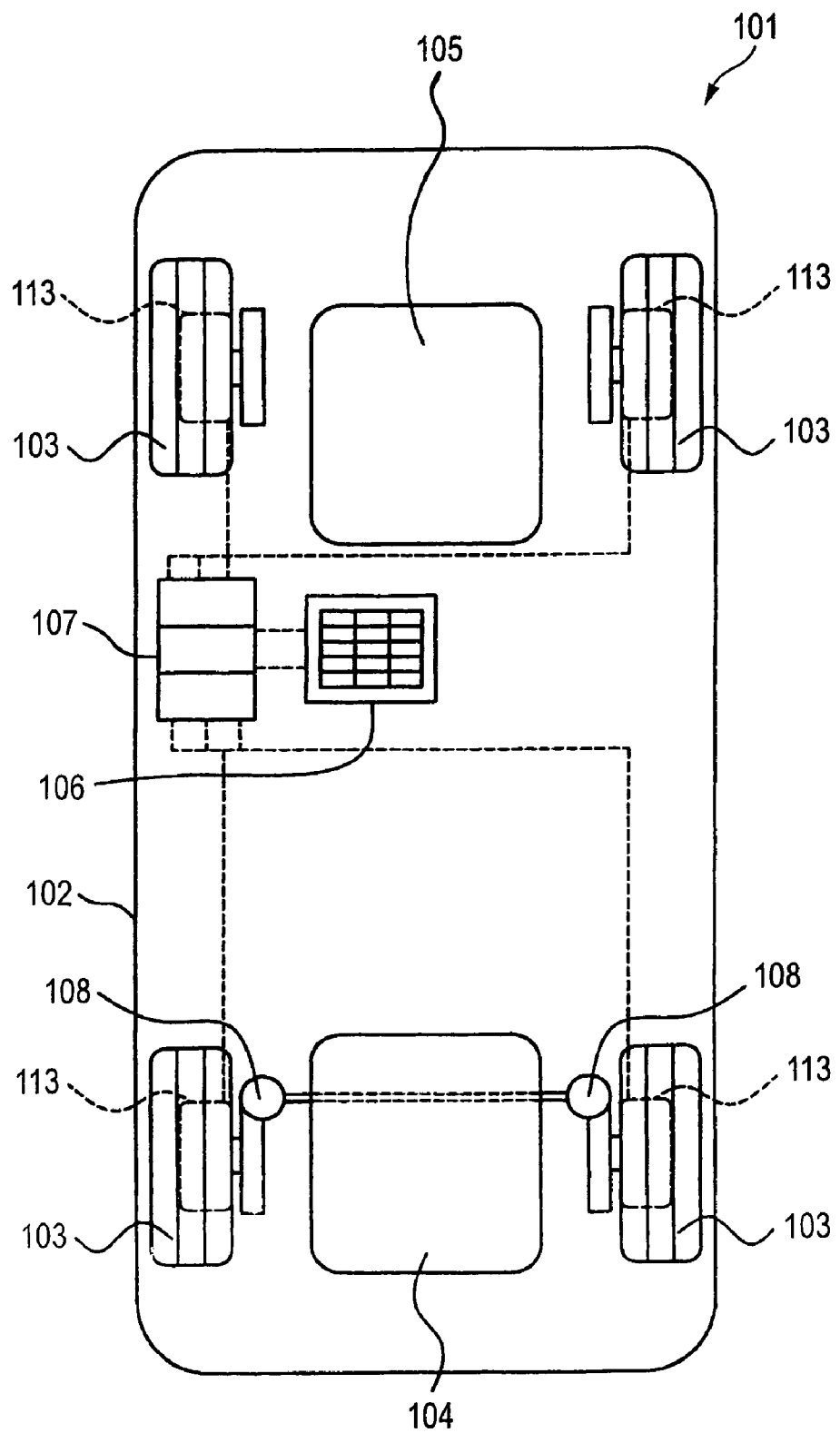
FIG. 7 is a schematic diagram illustrating the construction of an in-wheel motor type vehicle according to the related art.

However, the invention is not limited to the aforesaid construction, and as is illustrated by a modified example shown in FIG. 6, it may be adopted a construction in which suspensions 21 and electric motors (hereinafter, referred to as motors) 22 are provided also at the front of the vehicle 1, as with the embodiment that is described heretofore.

In this case, the suspension 21 includes a first link mechanism portion 24 having an upper arm 24A and a lower arm 24B which are, respectively, mounted between a vehicle body (not shown) and a drive wheel 23 by being connected therebetween, a shock absorber 26 as a resilient member rotatably attached to the lower arm 24B of the first link mechanism portion 24 via a connecting portion 25 and a second link mechanism portion 27 mounted between the upper arm 24A and the lower arm 24B of the first link mechanism portion 24. Then, the motor 22 is integrally provided on the second link mechanism portion 27, and the motor 22 is connected to the drive wheel 23 via a constant velocity joint 28, a drive shaft 29 as a drive axle and a ball joint 30 so as to rotate and drive the drive wheel 23.

In addition, the invention is not limited to the embodiments described above but may be modified variously. For example, the vehicle with electric motors of the invention can be applied, for example, to a two-wheel drive vehicle, a four-wheel drive vehicle, an electric vehicle or a hybrid vehicle, or even to a six-wheel vehicle.

As is described heretofore, according to the first aspect of the invention, since the suspension is made to include the resilient member for resiliently supporting the drive wheel relative to the vehicle body, the first link mechanism portion which connects the drive wheel to the vehicle body and the second link mechanism portion connected to the vehicle body side connecting portion of the first link mechanism portion and adapted for performing symmetrically vertical movements relative to the vertical movements of the drive wheel, and the electric motor is fixedly attached to the second link mechanism portion, when vibrations and/or shocks are applied to the drive wheel from the outside, the inertia energy resulting from the vertical movements of the drive wheel and the inertia energy resulting from the vertical movements of the electric motor can be offset against each other, whereby the unsprung weight of the suspension can be decreased, and the follow-up properties relative to irregularities on the road surface at the time of running, thereby making it possible to maintain the good riding comfort. In addition, since the left and right motors are disposed closer to the drive wheel sides, respectively, a wide space for mounting the fuel tank and the fuel cell can be secured, thereby making it possible to attempt to facilitate the enlargement of the fuel tank.

In addition, according to the second aspect of the invention, since the electric motor attached to the second link mechanism portion is made to move vertically around the drive wheel side center as a fulcrum in such a manner as to form an arc, in connecting the drive axle (the drive shaft) of the electric motor to the drive wheel, the angle of the joint between the drive axle and the drive wheel can be suppressed to a small angle.

According to the third aspect of the invention, since the drive force from the electric motor is made to be transferred to the drive wheel via the constant velocity joint, the drive axle and the ball joint, even in case the drive wheel and the second link mechanism portion move vertically, the drive force (rotation) of the electric motor can be transferred at constant velocities to the drive wheel via the constant velocity joint, the drive axle and the ball joint, thereby making it possible to maintain the running performance.

What is claimed is:

1. A vehicle with electric motors comprising:
   a vehicle body,
   electric motors functioning at least as drive sources,
   drive wheels which are rotated to be driven by the electric motors,
   suspensions each having a resilient member adapted for absorbing vibrations transmitted to the vehicle body from the drive wheel and resiliently supporting the drive wheel relative to the vehicle body and a first link mechanism portion adapted for allowing the drive wheel to move vertically relative to the vehicle body and supporting the drive wheel on the vehicle body, and second link mechanism portions each connected to a vehicle body side support portion of the first link mechanism portion and adapted for performing symmetrically vertical movements relative to the vertical movements of the drive wheel,
   wherein each electric motor is fixedly attached to each respective second link mechanism portion, and
   wherein each electric motor is disposed on an opposite side of the resilient member relative to a corresponding drive wheel.

2. The vehicle with electric motors as set forth in claim 1, wherein the electric motor attached to the second link mechanism portion moves vertically around a drive wheel side central point as a fulcrum in such a manner as to form an arc.

3. The vehicle with electric motors as set forth in claim 1, wherein a drive force from the electric motor is transferred to the drive wheel via a constant velocity joint, a drive axle and a ball joint.

4. The vehicle with electric motors as set forth in claim 1, wherein the first link mechanism portion comprises a first arm mounted to and oscillating between the vehicle body and the drive wheel.

5. The vehicle with electric motors as set forth in claim 4, wherein the first link mechanism portion further comprises a second arm mounted to and oscillating between the vehicle body and the drive wheel, the second arm being disposed beneath the first arm.

6. The vehicle with electric motors as set forth in claim 5, wherein the resilient member is rotatably attached to the second arm via a connecting portion.

7. The vehicle with electric motors as set forth in claim 5, wherein the second link mechanism portion is mounted between the first and second arms of the first link mechanism portion.

8. The vehicle with electric motors as set forth in claim 4, wherein a drive force from the electric motor is transferred to the drive wheel via a constant velocity joint, a drive axle and a ball joint.

9. The vehicle with electric motors as set forth in claim 5, wherein a drive force from the electric motor is transferred to the drive wheel via a constant velocity joint, a drive axle and a ball joint.

10. The vehicle with electric motors as set forth in claim 6, wherein a drive force from the electric motor is transferred to the drive wheel via a constant velocity joint, a drive axle and a ball joint.

11. The vehicle with electric motors as et forth in claim 6, wherein the connecting portion is located between each electric motor and the corresponding drive wheel.

12. The vehicle with electric motors as set forth in claim 7, wherein a drive force from the electric motor is transferred to the drive wheel via a constant velocity joint, a drive axle and a ball joint.

* * * * *